Sept. 17, 1940.　　　M. L. DEVOL　　　2,215,211
POLISH METER
Filed Dec. 22, 1937　　　5 Sheets-Sheet 1

INVENTOR.
MANSON L. DEVOL
BY Bradley & Bee
ATTORNEYS.

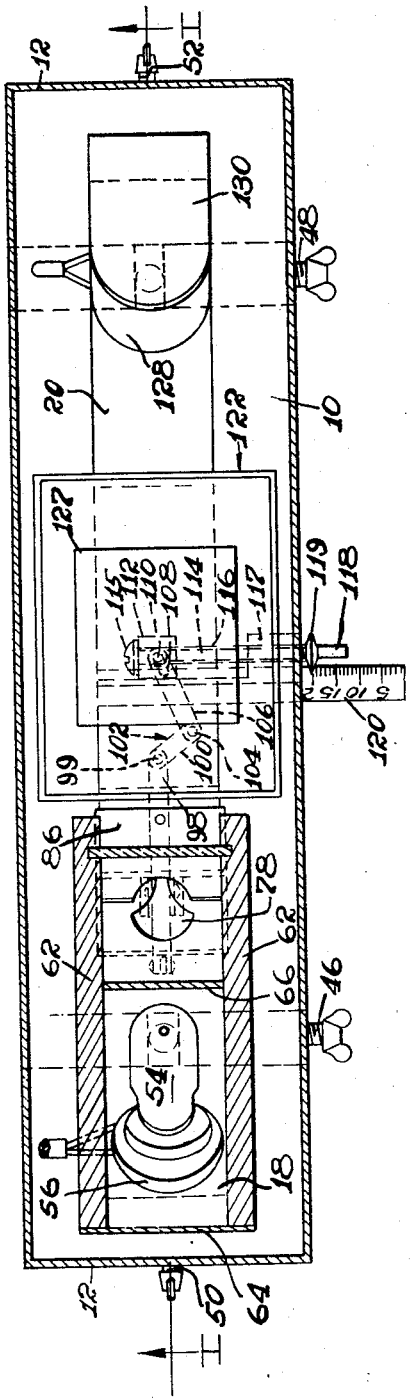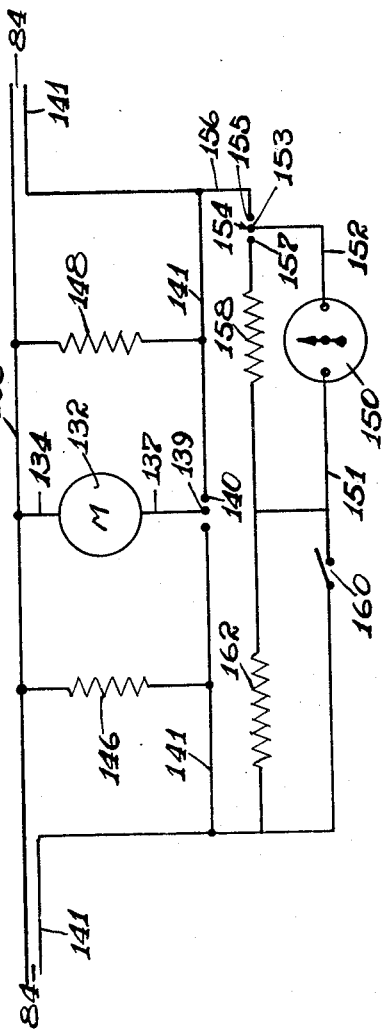

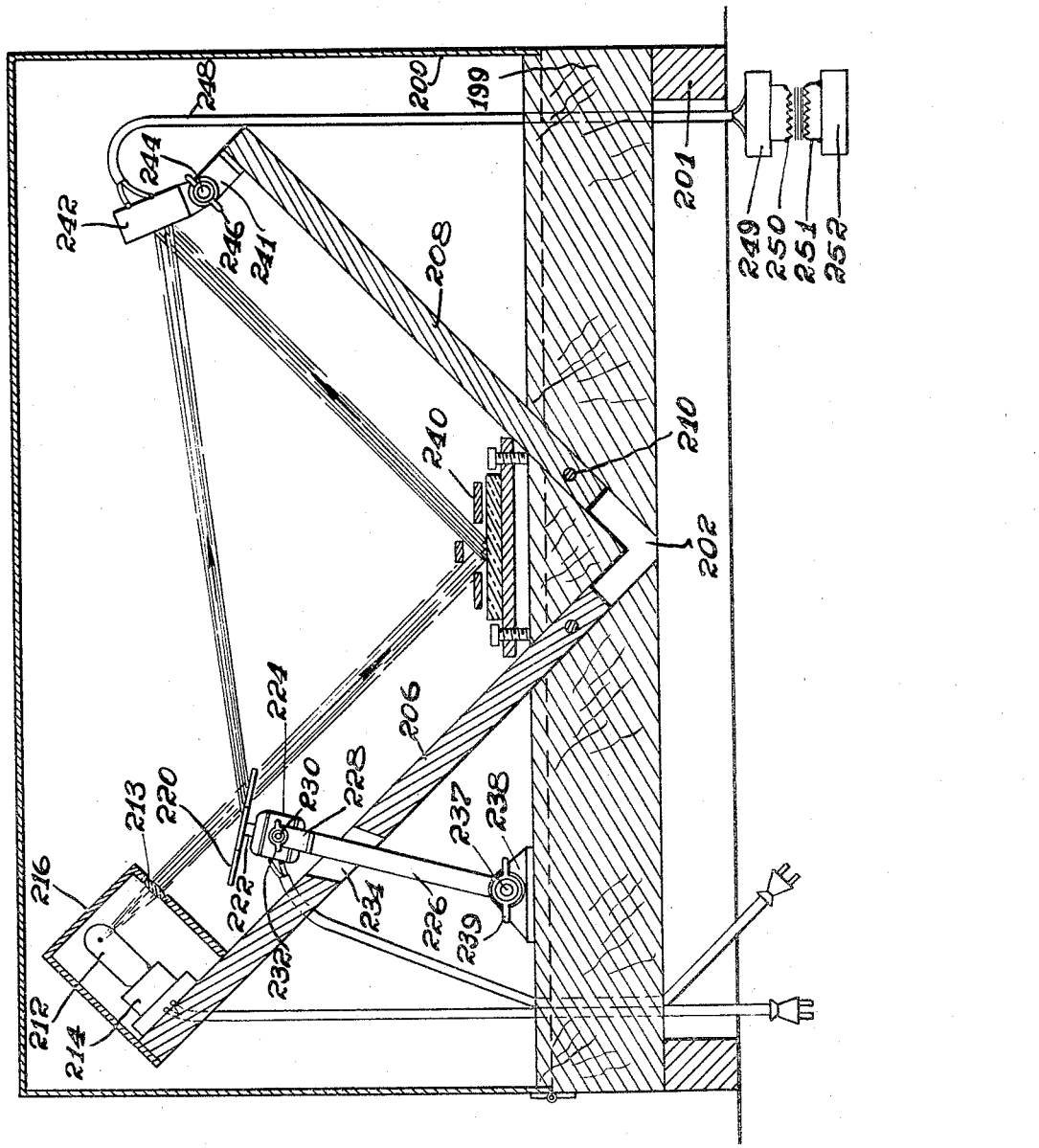

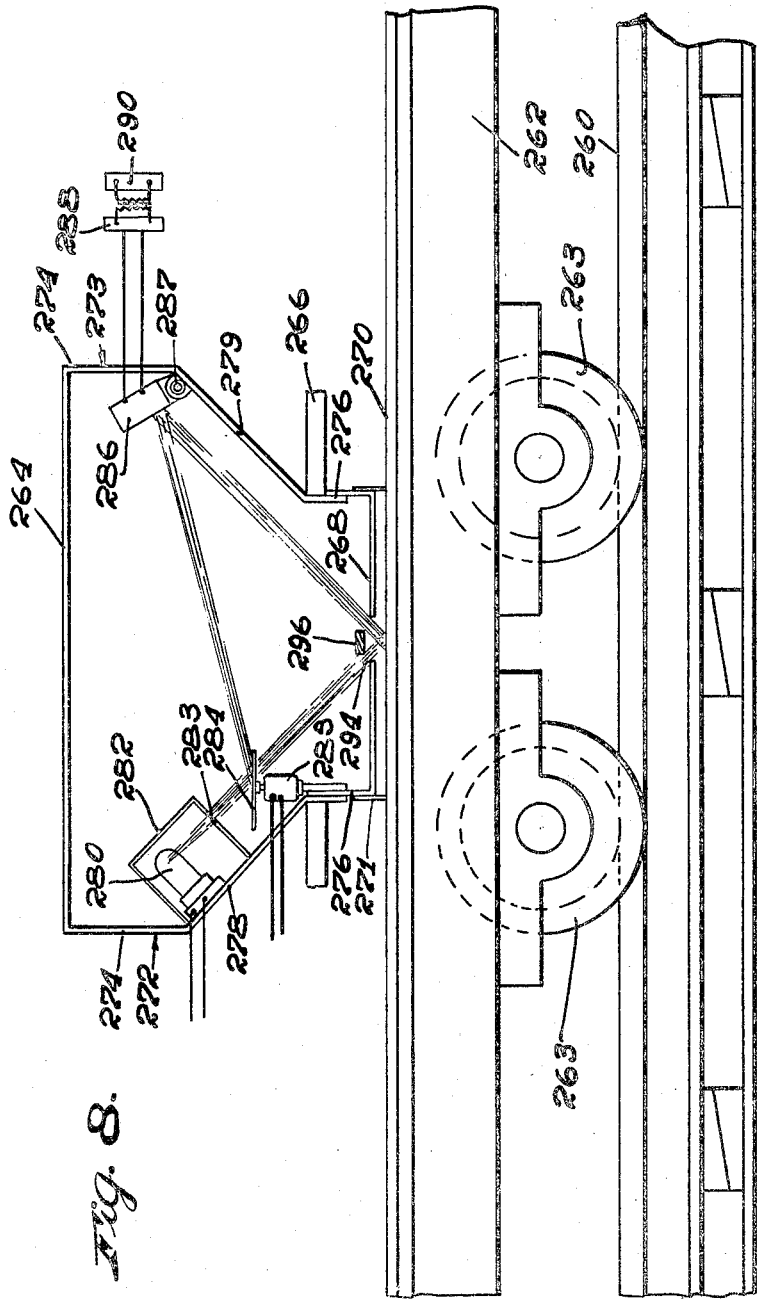

Patented Sept. 17, 1940

2,215,211

UNITED STATES PATENT OFFICE

2,215,211

POLISH METER

Manson L. Devol, Penn Township, Allegheny County, Pa., assignor to Pittsburgh Plate Glass Company, Allegheny County, Pa., a corporation of Pennsylvania Application December 22, 1937, Serial No. 181,123

14 Claims. (Cl. 88—14)

The present invention relates to apparatus for and methods of quantitatively determining the relative efficiency of surfaces as reflectors of light, and it has particular relation to the provision of a method of and apparatus for testing the relation intensity of reflection of light from surfaces of plates of such transparent materials as glass in order to determine the degree of polish thereof.

One object of the invention is to provide an apparatus for and method of quickly and accurately determining the relative intensity of the reflection from and therefore the polish of plane surfaces without reliance upon the personal judgment of the operator.

A second object is to provide a method of the above described characteristics which may be employed to determine the intensity of reflection from a single surface of such transparent materials as glass plates.

A third object of the invention is to provide apparatus by means of which readings can be made of the amount of light reflected from and therefore determine the polish of glass sheets while the latter are moving in a production line.

The common method of determining the degree of polish of plates or sheets of glass has involved qualitative observation of the amount of light reflected from the surface. This determination was difficult accurately to make because light is reflected back to the point of observation simultaneously from both surfaces of a sheet of glass. Of course any photometric determination of the intensity of this light included the composite readings of the reflection of both surfaces. For this and other reasons, the practical method heretofore commonly employed for determining polish has involved simple observation upon the part of an inspector. Such method obviously is not reliable because it is based solely upon the judgment of the observer. This is likely to be highly variable and to be of value requires much experience upon the part of the observer.

In practicing the present invention the foregoing difficulties are obviated by directing a beam of light obliquely against a suitable portion of one surface termed the light receiving or incident surface of a plate of glass then trapping out or diverting the component of light normally reflected from the other or back surface and making a quantitative photometric determination of the reflection from the first surface. By application of this method it is possible for relatively unskilled operators accurately to determine the polish of a plate or portion of a plate of glass without introduction of personal judgment. If desired the method may be applied to make continuous readings of the polish of sheets of glass moving past a given point in a production line in a factory.

For a better understanding of the invention reference may now be had to the accompanying drawings in which like numerals designate like parts.

In the drawings

Fig. 2 is a cross-sectional view taken substantially upon the line II—II of Fig. 1;

Fig. 3 illustrates diagrammatically the electrical circuit of the instrumentalities employed in practicing the invention;

Fig. 7 is a cross-sectional view of an additional form of the invention;

Fig. 8 is a cross-sectional view of still another embodiment of the invention.

Figure 1:
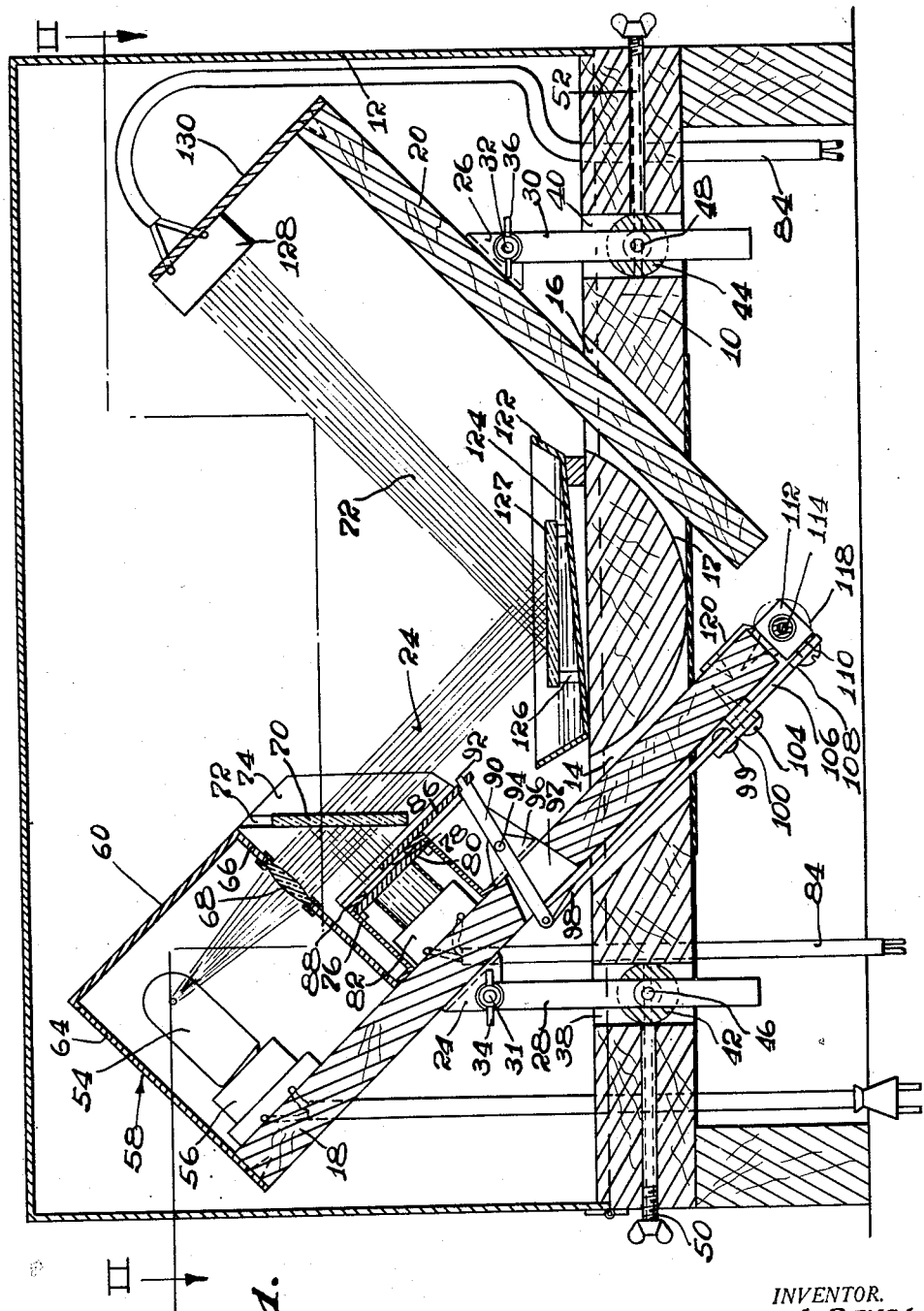
Fig. 1 is a vertical cross-sectional view of one embodiment of applicant's invention taken substantially upon the line I—I of Fig. 2.

In the embodiment of the invention disclosed in Fig. 1 a base or bottom 10 of a housing 12 for the various instrumentalities of the device is formed with a pair of upwardly diverging openings 14 and 16 having curved inner faces 17 and within the openings are disposed the lower portions of a pair of inclined supports 18 and 20.

For purposes of maintaining the supports in any desired position of angular or longitudinal adjustment, brackets 24 and 26 are secured to the lower faces thereof and vertical arms 28 and 30 are hingedly secured to the brackets by means of bolts 31 and 32 and may be locked at any desired angle with respect to the supports by means of wing nuts 34 and 36. Openings 38 and 40 also formed in baseboard 10 in outwardly spaced relation with respect to the openings 14 and 16 adjustably receive arms 28 and 30.

In order to admit of locking the arms in the openings 38 and 40 in any desired position of vertical or angular adjustment, shafts 42 and 44 are journaled in suitable bearings in the end portions of the openings and are transversely pierced to receive the arms. The shafts are also axially bored and tapped to receive set screws 46 and 48 by means of which the arms may be locked against vertical displacement. Rotational movement of the shafts is prevented by means of set screws 50 and 52 threaded through openings in baseboard 10 and contacting with the peripheries of the shafts.

Photometric apparatus for determining the degree of polish of glass plates includes a source of light, such as an electrical lamp 54 mounted in a suitable socket 56 upon support 18. The lamp is enclosed in a housing 58 having a top 60, side walls 62 and end walls 64 and 66, the latter of which is provided with an opening within which is disposed a condensing lens 68 that projects a beam or pencil of parallel light rays approximately parallel to support 18.

A polished glass plate 70 which serves to divide the light beam, is conveniently secured at any suitable angle, (e. g. 45°) with respect to the light rays, in grooves 72 formed in extensions 74 of side walls 62. Light reflected from the surfaces of plate 70 is projected at right angles to the incident beam of light upon a photometric device which includes a housing 76 mounted upon support 18 in spaced relation with respect to the lamp housing. An opening 78 which in the form shown approximates the shape of a conventional pen point, is provided in the top of the housing, and is closed by a piece 80 of ground glass or similar material which acts as a diffusing screen. Light entering the housing falls upon a photo sensitive element or cell 82 mounted upon support 18 and connected by means of a conductor 84, in circuit with means best shown in Fig. 3 for detecting current or electromotive force generated by the cell.

A sliding diaphragm 86 mounted over opening 78 in guideways 88 in side wall extensions 74 constitutes means for controlling the amount of light entering the cell. The diaphragm is actuated in, and the position thereof in the guideways is indicated by a mechanism which includes a lever 90 having a lug 92 upon the upper end thereof engaged in a suitable opening in the lower end of the slide. The lever is hinged intermediate of its length upon a pin 94 disposed in a bracket 96 upon support 18 and the lower extremity thereof projects through an opening 97 in support 18 and is pivotally connected to the upper extremity of a link 98. The latter in turn is pivoted by a pin 99 at its lower extremity to one arm 100 of a bell crank lever 102 which is pivoted at its apex upon a screw 104 that is threaded into support 18. The extremity of the other arm 106 of the bell crank lever is formed with a slot 108 to receive a pin 110 upon an actuating block 112. The block is journaled upon and is actuated by a transversely extending shaft 114 having a head 115 and a collar 116 between which the block is locked against axial displacement. The shaft is threaded into a suitable bearing 117 upon the lower extremity of support 18. A head 118 having a flange 119 constitutes a hand wheel for rotating the shaft. A transversely extending scale 120, upon the support 18, registers with the edge of flange 119 to indicate transverse displacement of the block 112 and correspondingly the size of the diaphragm opening to the photoelectric cell 82. By provision of a suitable scale (not shown) about the edge of flange 119 to indicate angular movement thereof, it is possible to determine the amplitude of movements of the diaphragm with micrometric precision.

A holder for plates of glass to be tested includes a shallow pan 122 disposed upon base 10 in front of support 18 in the path of the beam of light from the lamp 54. The pan is provided with a slightly inclined bottom 124 in order that light that is not absorbed may be reflected away at an angle with respect to light reflected from the sample. Blocks 126 upon the bottom of the pan support the sample 127 in horizontal position.

Light reflected from the sample is directed against a photo sensitive cell 128 upon a bracket 130 which is attached to the upper extremity of support 20. This cell 128 is joined to conductor 84 leading to the current indicating and measuring devices.

The latter as shown in Fig. 3 include a millivoltmeter 132, one lead 134 of which is connected to line 136 of conductor 84. The other lead 137 is joined to the central pole 139 of a double throw switch 140 which is disposed in the other line 141 of conductor 84. By means of this switch currents or voltages from either of cells 82 or 128 may be independently determined.

Resistances 146 and 148 shunted across the photoelectrical cells provide means for protecting the millivoltmeter and correcting for variations in the cells, due to temperature changes and such like disturbances.

For purposes of accurately determining when a balance has been attained between the electromotive forces from the photoelectrical cells 82 and 128, one pole of a galvanometer 150 is connected by a conductor 151 to conductor 141 upon one side of switch 140. The other pole is connected by conductor 152 to the central pole 153 of a three pole switch 154. A second pole 155 of the switch is connected by conductor 156 to conductor 141 upon the other side of switch 140. The third pole 157 of the switch is shunted across the galvanometer 150 by a resistance 158.

For purposes of further protecting the galvanometer during preliminary balancing of the circuit a switch 160 is disposed in line 151 and is shunted by a resistance 162. Preliminary readings of the galvanometer are made with this switch open to place the resistance in series with the galvanometer, but when final readings are to be made it is closed, thus shunting out the resistance and obtaining maximum sensitivity of the galvanometer.

In the operation of the apparatus, preliminary to testing a piece of glass, a standard plate, for example of black color, is placed upon the sample supports and the diaphragm 86 operated by means of screw shaft 114 to obtain a balance between the electromotive force generated in the cell 82 by light reflected from plate 70 and that generated in cell 128 by light reflected from the standard. This may be accomplished by operating switch 140 to obtain alternate readings from the cells while the diaphragm is being operated. When the electromotive forces from the two cells are nearly equal, the switch 140 is opened to cut out the millivoltmeter and switch 154 is operated while switch 160 is opened and the resistance 162 is in series with the galvanometer, in order to make a reading of the galvanometer. Final adjustment to obtain this reading is made with the switch 160 closed in order to shunt out resistance 162. When the cells 82 and 128 are balanced the reading of the galvanometer will be zero.

When the circuit is properly balanced for the standard body, the latter is removed and the sample is placed in position. In order to prevent reflection from the lower surface of the sample from influencing the readings, the sample pan is filled with a liquid such as oil of cloves having about the same index of refraction as the glass until the lower face of the glass is submerged. Reflection of light from the lower surface is thus prevented and light entering the glass which is not absorbed in passage falls upon the bottom of the pan where it is absorbed or reflected away from the photoelectrical cell 128.

With the sample in place and the lower surface properly immersed, the diaphragm 86 is again manipulated to balance the electromotive forces of the cells. The position of the diaphragm as determined by the position of the indicator hand wheel 119 with respect to the scale 120 indicates the degree of polish of the sample.

If desired, partial immersion of the samples in a liquid in order to prevent reflection from the lower surface may be obviated by provision of a body so disposed as to intercept the light reflected from the lower surface. A convenient device for the purpose is disclosed in Figs. 4, 5 and 6. It includes a grating 170, having ends 171 and connecting bars 172 so spaced that a beam of light will pass through one slot 173 and the reflected portion thereof will pass out through the next slot 174. On the other hand the reflection from the lower surface will be so displaced with respect to that from the upper surface that it will be cut off by the grating 170. Usually the surface of a glass plate will contain small depressions and elevations which may cause slight shifting or translations of portions of a beam of reflected light. In order to prevent these portions from being cut off by the grating it is desirable that the slot through which the reflected light passes be slightly wider than the slot for the incident light.

Figure 4:
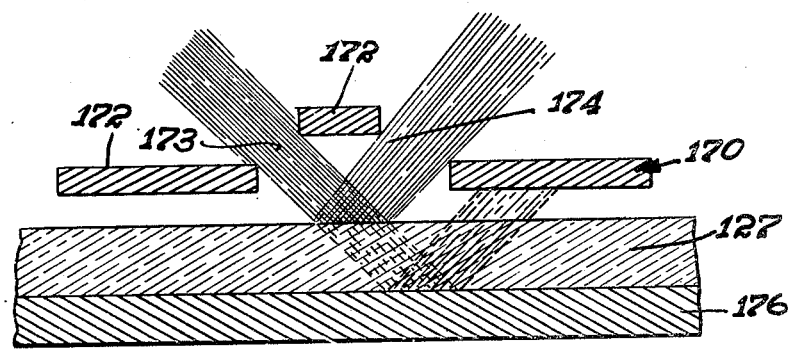
Fig. 4 is a fragmentary cross-sectional view of a grating employed to trap out light reflected from the lower face of glass plates.
Figure 5:
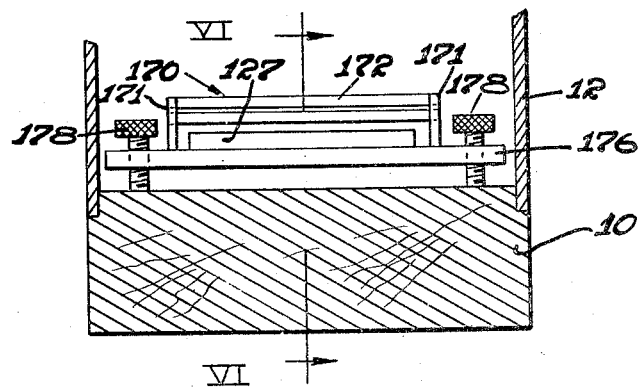
Fig. 5 is a fragmentary view showing in elevation the grating for trapping out light reflected from the lower surfaces of the plates and also the holder for supporting the plates.
Figure 6:
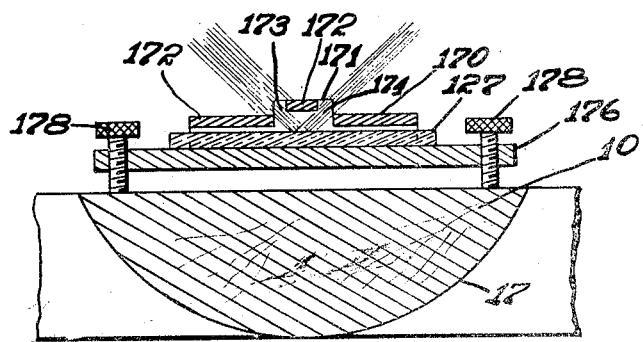
Fig. 6 is a cross-sectional view taken substantially upon the line VI—VI of Fig. 5.

The grating 170 shown in Figs. 4, 5, and 6 and the grating 240 shown in Fig. 7 perform substantially the same function as the oil bath and the bottom 124 of pan 122, shown in Figs. 1 and 2. That is, both the gratings and the oil bath with its associated bottom 124 function to prevent light from reflecting from the reverse or lower face of the glass to the photoelectric cell. Therefore, they are all definable as being means to prevent light passing through the incident face of the plate from being projected by reflection from the opposite face to the photoelectric cell and are so defined in certain of the claims.

As shown in Figs. 5 and 6 of the drawings, a sample holder for use in connection with this form of the invention may comprise a plate 176 which is adjustably supported by screws 178, threaded vertically therethrough.

In the operation of this embodiment of the invention the sample is disposed upon the plate 176 and the grating is placed over it. The positions of the various elements are then so adjusted that a beam of light from the lamp 54 passing through plate 70 will pass through the first slot 173 of the grating 170 and the portion reflected by the upper surface will be reflected through slot 174 to the photoelectrical cell 128 while that from the lower surface is intercepted by the lower surfaces of bars 172. The readings are then made in the manner described in connection with the embodiment of the invention disclosed in Figs. 1, 2 and 3.

In the embodiment of the invention disclosed in Fig. 7, a baseboard 199 upon supports 201 and having a covering 200 is provided with downwardly converging slots 202 having upwardly inclined arms 206 and 208 secured therein by means of clamping screws 210. A source of light such as lamp 212 is mounted in a socket 214 upon one end of support 206 and is enclosed in a housing 216, having a condenser lens 213 mounted in one wall thereof in position to direct a beam of light downwardly and inwardly in approximate parallelism to support 206.

A suitable interrupter is placed in the path of this beam thereby breaking it up into a series of rapid pulsations. The interrupter includes a polished segmental disc 220 which is secured upon shaft 222 of an electrical motor 224 in such position as to cut the beam. A suitable adjustable support for the motor and disc comprises an arm 226 having a forked yoke 228 upon the upper end. Bolts or threaded studs 230 projecting from the frame of the motor extend through the sides of the yoke and wing nuts 232 thereupon provide means for locking the motor at any desired angle within the plane of the fork. The arm 226 extends downwardly through an opening 234 in the support 206 of such size as to permit the arm to be swung to any position which can reasonably be required in the operation of the device. The lower end of the arm is pivotally secured by a bolt 237 to a bracket 238 upon baseboard 199 and is locked at any desired angle by means of a wing nut 239 threaded upon the bolt. The samples to be tested are disposed under a grating 240 which is disposed between supports 206 and 208 and which corresponds in construction and function to the grating 170 already described.

Support 208 is provided upon its upper extremity with a bracket 241 to which photoelectric cell 242 is hingedly secured by means of bolt 244 having a clamping nut 246 threaded thereupon. Normally the cell is clamped at the exact point of convergence of the beams of light from the disc 220 and the sample.

A conductor 248 connects the cell with suitable current measuring means. If there is any difference in the intensities of the beams of light reflected from disc 220 and the sample to be tested, it will be apparent that a rapidly pulsating current of electricity will be generated as the disc revolves and the greater the difference in intensity of the beams, the stronger will be the pulsations. The strength of these pulsations constitutes a criterion of the polish of the sample with respect to that of the disc. The pulsations free from any direct current components may be measured by passing the current through a transformer 249 the primary coil 250 of which is connected to conductor 248 and the secondary coil 251 of which is connected to suitable current measuring apparatus 252.

In the operation of this embodiment of the invention a suitable sample plate is first disposed under grating 240. The various elements are then so adjusted that the beams of light from the interrupter disc and the sample plate will meet upon the photoelectric cell. The motor is then started and a reading is made of the intensity of the pulsations generated in the photo cell as a result of the fluctuations in intensity of the light striking the cell as the disc revolves. Standardization of the apparatus may be effected by substitution of a plate of standard polish for the sample or in any other convenient way.

In Fig. 8 is disclosed an adaptation of the apparatus disclosed in Fig. 7 designed for making continuous or intermittent readings of plates of glass upon the cars in a polishing line. In this embodiment of the invention rails 260 and trucks 262 having wheels 263 running thereupon are of conventional design in grinding and polishing equipment.

The polish measuring instrumentalities comprise a housing 264 carried upon supports 266 above the cars 262 and having a bottom portion 268 slightly spaced from the plates of glass 270 and a skirt 271 designed to exclude stray light from the glass. The housing is of hopperlike cross-sectional contour and the end walls 272 and 273 have vertical top and bottom sections 274 and 276, and downwardly and inwardly inclined intermediate sections 278 and 279.

The operative elements of the apparatus are essentially the same as described in connection with the embodiment of the invention shown in Fig. 7 and include a lamp 280 in a housing 282, which is disposed upon section 278 and is provided with a condenser lens 283 that projects a beam of light obliquely downward. A segmental interrupter disc 284 is disposed in the path of the beam of light, upon the shaft of a motor 285 secured to bottom section 276 of end wall 272. A photoelectric cell 286 is hinged to a bracket 287 upon inclined section 279 in the path of the reflection from the disc and is connected to a transformer 288 and current-measuring device 290.

The bottom 268 of the housing is formed with an opening 294 and an intermediate bar 296 so disposed and spaced as to permit a beam of light from the lamp to pass downwardly through the opening, and strike the surface of the glass 270 and the reflection from the upper surface to strike the photoelectrical cell 286, but to cut off reflected light from the lower surface. The mode of operation of this embodiment of apparatus is essentially the same as that described in connection with Fig. 7 of the drawings except that observations are made upon plates while they are passing under the apparatus upon cars 262. Observations may be made while the glass is in continuous motion in a grinding and polishing line, for purposes of inspecting the entire output of the line. Obviously a plurality of units may be spaced transversely in order to admit of inspection of various portions of the width of the plates.

The various embodiments of the invention are simple in design and their use admits of the determination of the relative degree of polish of a plate of glass with a high degree of accuracy, even by relatively inexperienced operators.

The forms of the inventon herein shown and described are to be considered merely as illustrative and numerous modifications may be made therein without departure from the spirit of the invention or the scope of the appended claims.

What I claim is:

1. A method of determining the polish of a light transmitting plate of glass, which comprises projecting a beam of parallel light rays obliquely upon the front face of the glass, entrapping and absorbing substantially all of the light which passes through the said face of the plate including that which reflects from the rear face of the plate and determining the intensity of the specular reflection from the first-mentioned face.

2. In a method of determining the polish of a transparent plate of glass the steps, which comprise projecting a beam of light rays obliquely upon the front face of the glass, entrapping and absorbing substantially all of the light which passes through said face and strikes the rear face of the plate and determining the intensity of the specular reflection from the first mentioned face for comparison with a standard reading.

3. In combination in apparatus for measuring the relative reflection of light rays from a plate of transparent glass, means to support a glass plate, means to project a beam of light rays obliquely upon a plate upon the support, a grating disposed over the plate and having an opening therein disposed to permit the incident beam to strike the plate, said grating having a second opening formed in position to permit the component of the beam reflected from the light-receiving surface of the plate to pass while that component of the beam reflected from the opposite surface of the plate is intercepted by the grating and photometric means to measure the intensity of the light reflected from the first-mentioned surface.

4. An apparatus for measuring the degree of polish of a light-transmitting glass plate, which comprises a support for the plate to be tested, a source of light, means for concentrating the light into a beam of parallel rays, and projecting it obliquely against one face of the glass plate when the latter is positioned upon the support, an interrupter for intermittently intercepting the beam of light to reflect it away from said glass plate along a path intersecting the path of the light specularly reflected from the incident face of the plate to be tested, a photoelectric cell positioned at the intersection to receive the reflected light from both the interrupter and the glass plate, and an electrical meter connected to said cell to measure the strength of the electrical pulsations generated by differences between the intensities of the light reflected from the plate and the interrupter and means to prevent reflection of light from the reverse surface of the plate back to the photoelectric cell.

5. An apparatus for measuring the degree of polish of a light-transmitting glass plate, which comprises a support for the plate to be tested, a source of light, means for concentrating the light into a beam of parallel rays, means for directing said beam of light angularly against the glass plate upon the support, means intermittently to intercept the incident beam of light and to reflect it away from said glass plate, a grating positioned over the glass plate, said grating having two spaced openings formed therein, one being disposed to permit the incident beam of light to strike the glass plate and the second opening being disposed to permit the light reflected from the light-receiving surface to pass, but to bar light reflected from the opposite surface, a photoelectric cell positioned to receive the light specularly reflected from the light-receiving surface and the intercepting means, and an indicating device connected to said cell to measure the intensity of the electrical pulsations generated in the cell by differences in the intensities of the two reflections.

6. An apparatus for measuring the degree of polish of a glass plate, which comprises a source of light, a lens to concentrate the light into a beam of parallel rays, means for mounting the glass plate to be tested obliquely across the beam of light, a motor driven shutter positioned to intercept intermittently the incident light beam and to reflect it away from said glass plate, a photoelectric cell positioned to receive the beams of specularly reflected light from the shutter and the plate and an electrical meter connected to said cell to measure the intensity of the electrical pulsations generated in the cell by differences in the intensities of the two beams, means to prevent reflection of light from the back of the plate, said means comprising a grating having two openings formed therein, one being disposed to allow the incident beam of light to strike the plate, the second opening being so spaced and of a size to permit light reflected from the light-receiving face of the plate to strike the photo-electric cell, but to intercept light reflected from the back of the plate.

7. A method of measuring the degree of polish of a glass plate, which comprises mounting the glass plate to be tested obliquely of a concentrated beam of light, disposing over the plate a grating having two openings formed therein, one permitting the incident beam of light to strike the plate and the second opening being spaced therefrom and of a size to permit the component of the beam reflected from the incident surface to pass, but to bar the component of the beam reflected from the opposite surface of the plate, collecting the specularly reflected light from the incident surface in a photoelectric cell, and measuring the electromotive force generated by said cell under the action of the reflected light.

8. A method of measuring the degree of polish of a glass plate, which comprises mounting the glass plate to be tested obliquely across a beam of light, superposing on the upper surface of the glass, a grating having two openings, one being disposed to permit the incident ray of light to strike the plate, the second opening spaced therefrom in such manner and being of such size as to permit the component of the beam reflected from the incident face to pass, but to entrap the component reflected from the opposite face, collecting the light reflected from the upper surface of said glass plate in a photoelectric cell, intermittently intercepting the incident beam of light and reflecting it directly to said photoelectric cell, and measuring the electromotive force generated by said cell under the action of the reflected light.

9. In combination in apparatus for measuring the degree of polish of a transparent glass plate, a support for the plate the polish of which is to be measured, a source of light, means for concentrating the light into a beam of parallel rays and directing it obliquely against the incident face of the plate when the latter is positioned upon the support, a photoelectric cell positioned to receive the specularly reflected light from said face, a current indicating device connected to the cell and means to prevent light passing through the incident face of the plate from being projected by reflection from the reverse face of the plate to the cell, so that only the component of the beam reflected from the incident face strikes the photoelectric cell.

10. In combination in apparatus for measuring the polish of a light-transmitting glass plate by determination of the relative intensity of light reflected from the incident surface of said plate, a support for a plate to be tested, means for projecting a beam of light obliquely against the incident surface of a plate upon the said support, a container for holding a liquid medium of approximately the same index of refraction as the glass plate in contact with the lower face thereof to prevent reflection of light from the said face, means preventing light passing through the plate and into the medium from reflecting back to the plate, a photoelectric cell positioned to receive light specularly reflected from the incident face of the plate and a galvanometer connected to the cell to determine the strength of the electric current generated in the photoelectric cell by the light striking it.

11. An apparatus for measuring the degree of polish of a plate of transparent material, which apparatus comprises a support for said plate, a source of light for projecting a beam of light obliquely upon the incident surface of a plate to be tested upon said support, a transparent body having a surface disposed to intersect the beam of light, the surface of the body constituting a transparent reflector for a portion of the light to project it at an angle to the main beam, but to let the remainder pass, photometric means positioned to receive and measure the reflected light from the transparent body, a liquid medium of approximately the same index of refraction as the material of the plate to be tested in optical contact with the lower face of said plate, a second photometric means positioned to receive and measure the light specularly reflected from the incident face of the plate to be tested and means preventing light passing through the plate into the liquid medium from reflecting back through the plate to the second-mentioned photometric means.

12. Apparatus for measuring the degree of polish of a plate of transparent material, which apparatus comprises a support for said plate, a means for projecting a concentrated beam of light obliquely upon the incident surface of said plate, a transparent body having a surface constituting a transparent reflector and being a standard for comparison with the plate to be tested, disposed to intersect the beam for reflecting a portion of the light at an angle to the main beam, but to let the remainder pass to the incident surface of the plate to be tested, photometric means to receive and measure the reflected light from the surface of the transparent body, a second photometric means disposed to receive and measure the specularly reflected light from the incident face of the plate to be tested for comparison with that reflected from the transparent body, and means for preventing the reflection of light from the reverse surface of the plate to be tested back to the second-mentioned photometric means.

13. A method of determining the polish of a light-transmitting plate of glass, which method comprises immersing the reverse face of the plate in a liquid medium having substantially the same index of refraction as the plate to be tested, projecting a beam of parallel light rays obliquely upon the incident face of the plate, entrapping the component of the light passing from the plate into the liquid medium and determining the intensity of the specular reflection from the incident surface of the plate as a criterion of the degree of polish of the plate.

14. A method of measuring the degree of polish of a light-transmitting glass plate, which method comprises mounting the plate to be tested angularly across a concentrated beam of light passing obliquely through a transparent plate, constituting a standard for comparison, measuring the intensity of the light specularly reflected from the second-mentioned plate, applying a liquid medium having substantially the same index of refraction as the glass to the reverse face of the plate to be tested, entrapping the light passing through the plate to be tested into the medium, measuring the intensity of the light specularly reflected from the incident face of the plate to be tested and comparing it with that of the light reflected from the plate constituting a standard for comparison.

MANSON L. DEVOL.